June 17, 1958
F. R. LABIN
2,838,866
FISHING GEAR
Filed Nov. 22, 1955
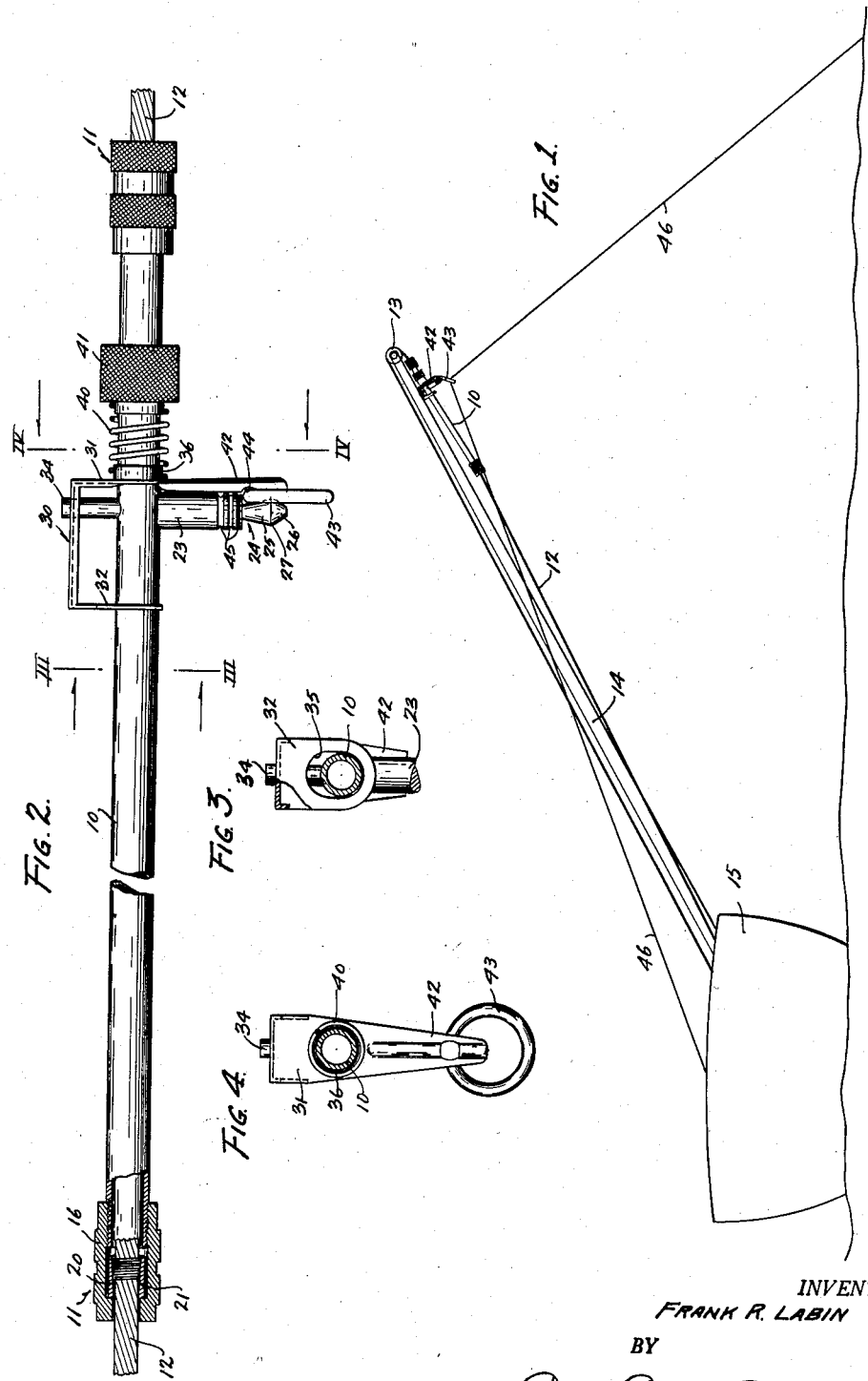
INVENTOR.
FRANK R. LABIN
BY
Bean, Brooks, Buckley & Bean.
ATTORNEYS ated June 17, 1958

2,838,866
FISHING GEAR
Frank R. Labin, Miami, Fla.

Application November 22, 1955, Serial No. 548,343

10 Claims. (Cl. 43—4)

My invention relates in general to fishing gear used in deep sea troll-fishing and in particular to a time-delayed release carried by an outrigger pole.

As is well known to those skilled in the art, in successful deep sea troll-fishing it is desirable that there be a period of time during which the bait is not moving after once it has been struck by the fish before attempts are made to bring the fishing line under tension.

The principal object of my invention has been, therefore, to provide a simple and practical device for producing slack in the line, thereby introducing a short period of time between the instant the fish takes the bait and the placing of the fish line under tension.

Another object has been to provide a device which can readily be attached to the release rope carried by an outrigger pole.

A further object is to provide a fishing line release which shall detachably hold the line in a releasable manner but which shall not prevent the free passage of the line through the device.

Another object is to provide a device having means for adjusting the release independently of the size or weight of the lure being used on the fish line.

A further object is to provide a device which is designed to accommodate various sized fishing lines and to hold them under adjustable tension.

Moreover, my device includes a closed ring member which is releasably held by the device and through which a fishing line may be loosely threaded so as to be freely moved therethrough at the will of the fisherman.

Furthermore, my invention provides a release having relatively few parts, is inexpensive to manufacture, and due to its simplicity is not apt to wear out or get out of order.

The above objects and advantages have been accomplished by the device shown in the accompanying drawings, of which:

Fig. 1 shows a side elevation of an outrigger pole equipped with my invention;

Fig. 2 is an enlarged side elevation of my invention;

Fig. 3 is a sectional view taken on line III—III of Fig. 2; and

Fig. 4 is a similar section taken on line IV—IV of Fig. 2.

My device comprises a tubular body 10 to each end of which is attached a swivel connection 11 for the release rope 12 of the outrigger pole. As shown in Fig. 1 this rope is passed over a pulley 13 carried by the outrigger pole 14 having its inner end supported in any well known manner in the boat 15. Each of the swivels 11 comprises a casing 16 having a swivel sleeve 20 mounted therein. The sleeve 20 is preferably formed with a tapered bore 21. The collet is placed upon the end of the rope 12 at the place where it is to be fastened and it is prevented from being pulled out of the swivel by the clamping action between the collet and the sleeve.

Mounted near the outer end of the body 10 of my invention is an abutment post 23 which extends outwardly perpendicular to the axis of the tubular body. Formed at the outer end of this post is an abutment stud 24 which is provided with an outer end of double cone-frustum shape formed from an inner cone 25 and an outer cone 26 having their bases adjacent each other thereby forming oppositely inclined cam surfaces meeting and joining each other at the ridge 27.

Carried by the body is a release member 30 comprising an outer leg 31 and an inner leg 32. The legs 31 and 32 are spaced from each other and are joined by a release arm 33 arranged preferably at right angles to the legs. The release arm is formed with an aperture through which a fulcrum pin 34 passes. The fulcrum pin is preferably a part of and is coaxially arranged with the abutment post 23. The inner leg 32 of the release member is formed with a slot 35 for disposition over the body 10 and for lateral movement therewith so as to accommodate pivotal action of the member upon the fulcrum pin 34. The outer leg 31 is also disposed about the body 10 and is loosely fitted thereon. A collar 36 is formed on the outer face of the outer leg 31, and a tension spring 40 has one end mounted about the collar and bearing against the outer face of the leg 31. The other end of this tension spring bears against a tension adjusting nut 41 which is screwthreaded to the body and provides means for adjusting the tension of the spring upon the release member.

The outer leg 31 is formed with a release clip 42 which extends outwardly across the upper outer face of the abutment post 23 and over the abutment stud 24. A detachable ring 43 is placed beneath the release clip and between it and the abutment stud 24. The release clip is preferably formed on its under surface with an indentation 44 for registration with the ring, whereby the ring will be temporarily held against the cam shaped surface of the inner cone 25 of the abutment stud 24 ready to be quickly released therefrom by a quick jerk produced by a fish taking the bait.

When the device is to be put in use, the release rope is attached at each end to the swivel connectors 11 and after which the device is run out to the end of the rigger pole. Before being run out, the fishing line 46 is freely threaded through the detachable ring 43 and the ring is put in place under the release clip and in engagement with the cam surface of the inner cone 25 as shown in Fig. 2. In cases where the ring is not used, the fishing line is placed under the release clip 42 and engaged with the groove 45 of the abutment post which is of the proper size for the line being used. By means of the adjusting nut 41 the tension placed upon the release clip 42 may be suited to the size and weight of the lure being used which may vary from one ounce to as much as five pounds.

It will be clear that as the fish strikes the bait, the detachable ring will be released from its engagement with the abutment stud and together with the line will fall to the surface of the water. When being released, the cam surface of the inner cone 25 will cause the ring to ride over the ridge 27 and to be quickly released from the post by the oppositely inclined cam surface of the outer cone 26. The time it takes the line to fall is sufficient to produce the delay period between the time the fish strikes and before the line is placed under tension. Obviously, when the fishing line alone is used without the ring, the line will become disengaged with the groove and thereby provide the required slack in the line.

From the foregoing, it will be obvious that the tension upon the detachable ring or upon the fishing line is such that the line may be reeled in or out at will without disturbing its attachment to the device. Furthermore, the tension nut 41 may be adjusted to the desired pull on the fishing line to release it from the device.

What is claimed is:

1. In a fishing gear including an outrigger pole, the combination with a fishing line, of a line release comprising a body, means for attaching said body to said pole, an abutment post carried by said body and having its axis normal to the axis of said body, a fulcrum pin carried by said body and extending from the side thereof opposite to said post, a release member mounted upon said body and fulcrumed upon said pin, said member having a release clip adjacent to said post, resilient means for pressing said clip against said post, and means carried by said post and said clip for detachably holding said line, whereby when released said line will momentarily have a predetermined amount of slack therein.

2. In a fishing gear including an outrigger pole, the combination with a fishing line, of a line release comprising a body, means for attaching said body to said pole, an abutment post carried by said body and having its axis normal to the axis of said body, a fulcrum pin carried by said body and extending from the side thereof opposite to said post, a release member having an inner leg and an outer leg joined by a release arm and loosely mounted upon said body, said arm being fulcrumed upon said pin for tilting movement of said outer leg, said member having said outer leg adjacent to said post, spring means carried by said body for resiliently urging said outer leg toward said post, and means carried by said post and said outer leg for detachably holding said line, whereby when released said line will momentarily have a predetermined amount of slack therein.

3. In a fishing gear including an outrigger pole, the combination with a fishing line, of a line release comprising a body, means for attaching said body to said pole, an abutment post carried by said body and having its axis normal to the axis of said body, a fulcrum pin carried by said body and extending from the side thereof opposite to said post, a release member having an inner leg and an outer leg connected by a release arm, said arm being fulcrumed upon said pin, said outer leg being loosely mounted upon said body above said fulcrum pin, said inner leg being mounted upon said body below said pin and formed with an elongated slot having its major axis parallel to the axis of said pin for tilting movement of said outer leg about said body and said pin, resilient means for keeping said outer arm pressed against said post, and means carried by said post and said outer leg for detachably holding said line, whereby when released said line will momentarily have a predetermined amount of slack therein.

4. In a fishing gear including an outrigger pole, the combination with a fishing line, of a line release comprising a body, means for attaching said body to said pole, a rigid abutment post carried by said body and extending outwardly therefrom at substantially right angles thereto, a fulcrum pin carried by said body and substantially coaxial with said post, and means carried by said post and fulcrumed about said pin for freely holding said line in a detachable manner upon said post under normal fishing operations, whereby a jerk upon the lure end of said line will disengage it from said post and momentarily provide a predetermined amount of slack therein.

5. In a fishing gear including an outrigger pole, the combination with a fishing line, of a line release comprising a body, means for attaching said body to said pole, a rigid abutment post carried by said body and extending outwardly therefrom at substantially right angles thereto, a release member fulcrumed upon said post body, a release clip carried by said member and resiliently held against said post, and means carried by said post and cooperating with said clip for freely holding said line in detachable engagement with said post under normal fishing operations, whereby a jerk on the lure end of said line will disengage it from said post and momentarily provide a predetermined amount of slack therein.

6. In a fishing gear including an outrigger pole, the combination with a fishing line, of a line release comprising a body, means for attaching said body to said pole, a rigid abutment post carried by said body and extending outwardly therefrom at substantially right angles thereto, said post being formed with a cone-frustum end, a resilient release member fulcrumed upon said body and having a release clip extending longitudinally adjacent said post, and a detachable ring disposed between the cone frustum end of said post and said clip, whereby when said ring is released by a jerk upon said line a predetermined amount of slack in the line will be momentarily produced.

7. In a fishing gear including an outrigger pole, the combination with a fishing line, of a line release comprising a body, means for attaching said body to said pole, a rigid abutment post carried by said body and extending outwardly therefrom at substantially right angles thereto, said post being formed with a cone-frustum end, a release member fulcrumed upon said body, said member comprising spaced inner and outer legs loosely engaging said body and joined by a release arm, said outer leg lying adjacent said post, and means carried by said post and cooperating with said outer leg for releasably holding said line upon said post, whereby when released said line will momentarily have a predetermined amount of slack therein.

8. In a fishing gear including an outrigger pole, the combination with a fishing line, of a line release comprising a body, means for attaching said body to said pole, a rigid abutment post carried by said body and having its axis normal to the axis of said body, said post having its outer end of double cone-frustum shape, the bases of the cones formed at the end of the post being joined to form a gable-shaped ridge, a detent ring for freely supporting said line during normal fishing operations, said ring being mounted upon said post and disposed back of said ridge, a resilient release member fulcrumed upon said body and having spaced inner and outer legs loosely engaging said body and joined by a release arm, said member having a release clip extending longitudinally adjacent said post and in bearing contact with said ring, whereby a jerk on the lower end of said line will cause said ring to be quickly released by passage over the cone-shaped end of said post.

9. In a fishing gear including an outrigger pole, the combination with a fishing line, of a line release comprising a body, means for attaching said body to said pole, a rigid abutment post carried by said body and extending outwardly therefrom at substantially right angles thereto, the end of said post being of cone-frustum shape, a release member fulcrumed upon said body, said member having spaced inner and outer legs connected by a release arm, said outer arm lying adjacent said post and provided with a release clip, resilient means for pressing said release clip into contact with said post, and means carried by said post and said release clip for detachably holding said line, whereby when released said line will momentarily have a predetermined amount of slack therein.

10. In a fishing gear including an outrigger pole, the combination with a fishing line, of a line release comprising a body, means for attaching said body to said pole, a rigid abutment post carried by said body and having its axis normal to the axis of said body, said post having its outer end of double cone-frustum shape, the bases of the cones formed at the end of the post being joined to form a gable-shaped ridge, a detent ring for freely supporting said line during normal fishing operations, said ring being mounted upon said post and disposed back of said ridge, a resilient release member fulcrumed upon said body and having a release clip extending longitudinally adjacent said post and in bearing contact with said ring, whereby a jerk on the lower end of said line will cause said ring to be quickly released by passage over the cone-shaped end of said post.

References Cited in the file of this patent

UNITED STATES PATENTS

| | | |
|---|---|---|
| 1,800,756 | Sass | Apr. 14, 1931 |
| 2,085,096 | Hansen | June 29, 1937 |
| 2,170,594 | Nicholson | Aug. 22, 1939 |
| 2,262,300 | Reynolds | Nov. 11, 1941 |
| 2,452,796 | Skibsted | Nov. 2, 1948 |
| 2,749,648 | Schneider | June 12, 1956 |

UNITED STATES PATENT OFFICE
CERTIFICATE OF CORRECTION

Patent No. 2,838,866                          June 17, 1958

Frank R. Labin

It is hereby certified that error appears in the printed specification of the above numbered patent requiring correction and that the said Letters Patent should read as corrected below.

Column 4, line 1, for "said post body" read — said body —.

Signed and sealed this 9th day of September 1958.

(SEAL)
Attest:

KARL H. AXLINE
Attesting Officer

ROBERT C. WATSON
Commissioner of Patents